UNITED STATES PATENT OFFICE.

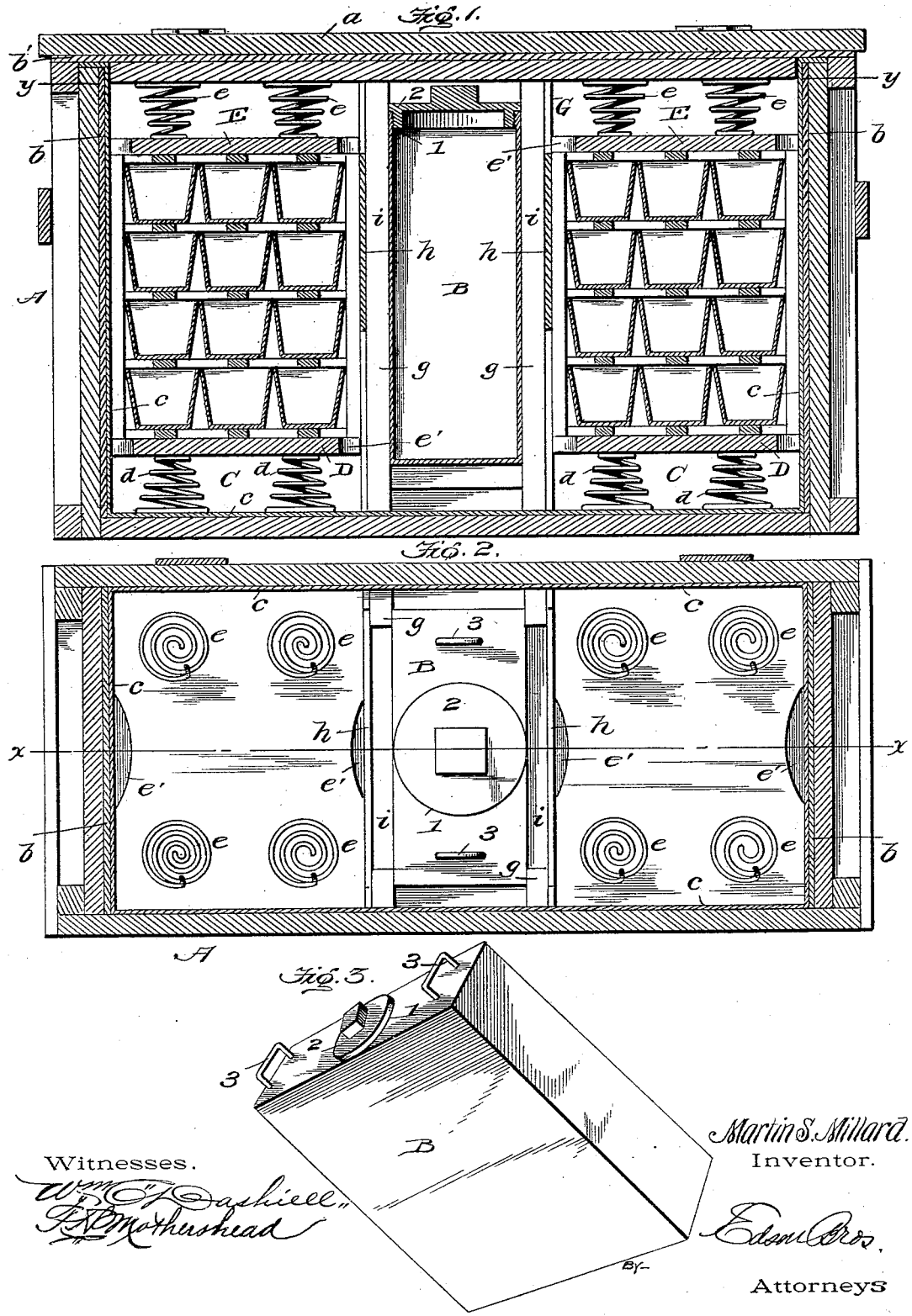

MARTIN S. MILLARD, OF KANSAS CITY, MISSOURI, ASSIGNOR OF ONE-HALF TO HARRY L. NICOL, OF SAME PLACE.

REFRIGERATING SHIPPING-CRATE.

SPECIFICATION forming part of Letters Patent No. 569,506, dated October 13, 1896.

Application filed March 20, 1894. Renewed March 24, 1896. Serial No. 584,688. (No model.)

*To all whom it may concern:*

Be it known that I, MARTIN S. MILLARD, a citizen of the United States, residing at Kansas City, in the county of Jackson and State of Missouri, have invented certain new and useful Improvements in Shipping-Crates; and I do hereby declare the following to be a full, clear, and exact description of the invention, such as will enable others skilled in the art to which it appertains to make and use the same.

The nature of this invention is a sealed shipping-crate designed for the transportation of perishable merchandise, particularly such as berries and fruits, for long distances without injury to the contents of the crate and so that they will reach the merchant or consignor in good wholesome condition. Perishable fruits from the southern climate have heretofore been shipped in refrigerator-cases in which the outside air is admitted for the purposes of circulation, but practical experience has demonstrated that such crates are objectionable, because the fruit is liable to mold and decay more or less while in transit, to become bruised by the jar and vibration of the train, and the water of condensation in the refrigerator-case is liable to drip onto the fruit and spoil the flavor. The crate of my invention obviates all these objections, because it is practically sealed from the admission of the outside atmosphere, and the refrigerator-tank and the walls of the crate are so constructed that a circulation of air by conduction is promoted from the warmest ends of the crate toward a central refrigerator-tank, the object in view being to secure dry cold air in the crate and to cause the moisture from the warm air and the exhalations of the fruit or other contents to be taken up by the circulating air-current and be brought into contact with the cold walls of the refrigerator-tank, whereby the warm exhalations are cooled and condensed and thereby deposited frost-like upon the tank and the metallic walls or surfaces of the crate. I have found by practical experiments that the best results are attained by securely inclosing a quantity of ice and salt in a refrigerator-tank, so as to prevent the circulating currents of warm air from having direct access to the ice in the tank in order that the air may be kept dry and cold and that any moisture or vapor exhaled from the contents of the crate may be condensed and deposited upon the metallic surfaces of the crate and refrigerator-tank.

My invention consists in the combination, with an air-tight shipping-crate and a refrigeratory tank therein, of spring-controlled followers disposed at the top and bottom of the provision-compartment, respectively, and adapted to confine between themselves the boxes or crates containing the fruit or other merchandise. In addition to affording a cushion for the provision crates or boxes in order to relieve them from the jar and vibration of the train these spring-controlled followers at the top and bottom of the crate serve the important purposes of forcing the air to circulate in the provision-compartment when the shipping-package is jarred or vibrated by the motion of the train, whereby the air in the sealed shipping-crate is caused to circulate positively by the action of the spring-followers and by conduction of the cold air from the refrigerator-tank passing to the ends of the provision-compartment and thus displacing the warm air, which is caused to pass to and in contact with the cold walls of the refrigerator-tank; and the invention further consists in the construction and combination of devices which will be hereinafter more fully described, and defined by the claim.

In the accompanying drawings, Figure 1 is a vertical sectional view through a shipping-crate embodying my invention, the plane of section being indicated by the dotted line $xx$ of Fig. 2. Fig. 2 is a horizontal sectional view on the plane indicated by the dotted line $yy$ of Fig. 1. Fig. 3 is a detail view of the detachable closed refrigerant-tank.

Like letters of reference denote corresponding parts in all the figures of the drawings, referring to which—

A denotes the case.

B is the central refrigerant-tank.

C are the provision-compartments on opposite sides of the refrigerant-tank, D D the lower followers at the bottoms of the provision-compartments, and E E the upper followers at the upper ends of the provision-compartments.

Although I prefer to provide the case A with two provision-compartments C C and to place the closed refrigerant-tank between the said compartments, yet I do not strictly confine myself to this precise arrangement, as I may place the refrigerant-tank at one end of the case A and employ a single provision-compartment. The two compartments and centrally-disposed refrigerant-tank, however, are advantageous in that the capacity of the case is increased and both surfaces of the tank are exposed to the action of the air-currents circulating in the shipping-case.

The case A is of the generally rectangular form shown, and is constructed in a cheap air-tight manner, with a cover or lid $a$ that is adapted to be tightly closed over the top of said case. The walls and bottom of the case are made of wood, then lined with heavy builders' paper $b$, and finally covered with a metallic lining $c$, all of which are suitably fastened together, so as to exclude air, make the case a good non-conductor of heat, and to form an inside metallic surface which can be rapidly cooled and which will condense the warm air that becomes deposited thereon and on the tank B in the form of frost. The cover $a$ is composed of two layers of wood united together with the grain of wood crossing the grain of the other to prevent warping and provided with an intermediate layer of paper $b'$, said cover being hinged at one edge to the case and provided with means for securely fastening and locking the other edge when the cover is closed, the whole case being designed and constructed to exclude the outside air, so that the air within the shipping-case can be kept dry and cold.

The tank B is constructed entirely of metal and so as to wholly inclose the body of ice in order to prevent the warm air from having direct contact with the ice and to make the same last a long time without renewal. This metallic closed tank is provided at its upper end or head with a screw-threaded filling-orifice 1, which is closed by means of a removable threaded plug 2, and for the purpose of conveniently removing the tank from the case it is furnished with the bails or handles 3. Said tank is fitted transversely in the case A at the middle thereof, so as to form or divide it into the two provision-compartments, and to keep the tank in place and provide for the circulation of air around the same I form the retaining-frame G, which is constructed with ways or guides $g$ $g$, and the side shields or walls $h$ $h$, that prevent the provision-crates from being jostled or thrown against the tank, and thereby produce the air-circulating spaces $i$ $i$ to enable the warm air to have direct access to and contact with the cold metallic surfaces of the refrigerant-tank. This retaining-frame G has the ways or guides $g$ $g$ securely fastened to the sides of the case A, and the side shields or walls $h$ $h$ are fastened to the edges of the ways $g$. Said walls $h$ do not, however, extend the full depth of the case A in order that the cold air at the bottom part of the case may freely circulate or pass to the ends of the provision-compartments.

The tank B fits snugly within and between the ways $g$ $g$, by which the tank is held from displacement, and the tank is of less transverse width than the width of the space between the walls or shields $h$ $h$ in order to form the air-circulating spaces $i$ $i$ between the tank and the walls or shields.

Each compartment C is furnished with the followers D E at the top and bottom thereof. These followers in the compartments are backed or cushioned by means of the springs $d$ $e$, and the followers are arranged to face each other, so as to bear against the bottom and top, respectively, of the tiers of crates, which are stacked one on top of the other in the usual manner within each provision-compartment. The springs $d$ $e$ are preferably of the coiled or helical variety, and as the bottom follower and springs must sustain the weight of the tier of crates I prefer to place a greater number of springs or stronger springs below the bottom follower than are provided to the top follower. These followers are notched or recessed at their edges at $e'$ to permit the air to pass around them, but the followers present nearly continuous surfaces in order that they may operate efficiently when they are jarred or vibrated by the motion of the train to force the air in a measure, and thus promote the circulation.

The inside surface of the hinged cover $a$ of the case A is not lined with metal, thus obviating the condensation of moisture on the cover and preventing any drip within the case, which would tend to wet the contents of the crate and spoil the flavor.

In using my crate the tank is nearly filled with ice and about five per cent. (5%) of salt is placed with the ice in the tank. After the tank is placed in the case A the lid $a$ is tightly closed and the crate is allowed to rest until its interior is thorougly cooled and any moisture therein is condensed and deposited on the walls of the crate and tank. The bottom followers are then quickly placed in the compartments C, the tiers of crates filled with fruit or other perishable substance are placed on top of the bottom followers, and the top followers are adjusted in the tiers of crates, after which the lid is closed down and securely fastened to exclude the outside air, the springs $e$ of the top followers resting against the non-metallic cover. The tiers of crates and fruits are thus confined between two sets of oppositely-disposed yielding followers which take up the jar and vibration and prevent the fruit from being jostled and bruised; and said followers serve the further purpose of causing the air in the case to circulate when the case is subjected to considerable jar or vibration from the motion of the train. The moisture in the air coming in contact with the cold walls of the tank is cooled, condensed, and thereby precipitated to the bottom of the case, whence it diffuses and displaces the warm air, which is caused to flow toward the tank to be in turn cooled and condensed, thus setting up the circulation by conduction of the air, and this warm air takes up the moisture and other exhalations from the contents of the crates, so that they are condensed and deposited on the walls of the tank and case A. The air is thus cooled and freed from moisture by condensation and contact with the cold metallic surfaces of the refrigerant-tank, whereby the air is kept in a cold, dry, and light condition, as no atmosphere is permitted to enter the shipping-case.

I have found that fruits and other perishable commodities can be transported for long distances in good condition with a shipping-crate constructed in accordance with my invention, because the commodity is relieved to a great extent from the jar and vibration of the train and the atmosphere is kept in a cold dry condition, which is most favorable to the preservation of the commodity.

I am aware that changes in the form and proportion of parts and in the details of construction of the devices herein shown and described as an embodiment of my invention can be made without departing from the spirit or sacrificing the advantages thereof, and I therefore reserve the right to make such modifications as fairly fall within the scope of my invention.

Having thus fully described my invention, what I claim as new, and desire to secure by Letters Patent, is—

The refrigerator shipping-crate herein shown and described comprising a closed casing provided with metallic lining and a tightly-fitting cover, the vertical guide-uprights $g$ fastened centrally within the case and having the side shields $i$ secured thereto, a closed refrigerant-tank B fitted between the guides $g$ and out of contact with the side shields $i$, and the top and bottom sets of spring-cushioned followers D, E, arranged within the respective provision-compartments of the case, the lower followers D having their springs resting upon the bottom of the case, and the upper follower E arranged to face the lower followers and with their cushion-springs bearing against the cover of said case, for the purposes described, substantially as set forth.

In testimony whereof I affix my signature in presence of two witnesses.

MARTIN S. MILLARD.

Witnesses:
JOSEPH ROBERTSON,
J. H. WILLIAMS.